United States Patent [19]

Lanfer et al.

[11] Patent Number: 5,138,560
[45] Date of Patent: Aug. 11, 1992

[54] POSITION INDICATING APPARATUS FOR CRANE WAYS, OVERHEAD CONVEYORS, AND THE LIKE

[75] Inventors: Hermann Lanfer, Kunzelsau; Dieter Kugler, Ohringen-Cappel; Dieter Rieger, Sindrigen, all of Fed. Rep. of Germany

[73] Assignee: R. Stahl Fordertechnick GmbH, Kunzelsau, Fed. Rep. of Germany

[21] Appl. No.: 500,763

[22] Filed: Mar. 28, 1990

[30] Foreign Application Priority Data

Apr. 4, 1989 [DE] Fed. Rep. of Germany ....... 3910873

[51] Int. Cl.$^5$ .......................... G06F 15/20; H06N 7/18
[52] U.S. Cl. ............................. 364/516; 364/424.02; 235/454
[58] Field of Search .................. 364/516, 424.02, 559; 235/375, 454, 384; 356/401, 374; 212/131, 132; 198/349.95; 180/169

[56] References Cited

U.S. PATENT DOCUMENTS

| | | | |
|---|---|---|---|
| 3,784,791 | 1/1974 | Pease | 235/354 |
| 4,566,032 | 1/1986 | Hirooka et al. | 364/424.02 |
| 4,846,297 | 7/1989 | Field et al. | 364/424.02 |
| 4,947,094 | 8/1990 | Dyer et al. | 364/424.02 |
| 4,968,209 | 11/1990 | Noble | 180/169 |

FOREIGN PATENT DOCUMENTS

| | | | |
|---|---|---|---|
| 0046308 | 2/1987 | Japan | 364/424.02 |
| 1284641 | 8/1972 | United Kingdom. | |
| WO84/01027 | 3/1984 | World Int. Prop. O. | |

*Primary Examiner*—Parshotam S. Lall
*Assistant Examiner*—Ellis B. Ramirez
*Attorney, Agent, or Firm*—Frishauf, Holtz, Goodman & Woodward

[57] ABSTRACT

A position indicating apparatus for crane ways and overhead conveyors and the like includes a code carrier (11), which carries multi-value code marks (18) in one track along its length. The code marks (18) are combined into blocks (17), with which a block identification (22) is associated. Cooperating with the code carrier (11) and the block identification (22) are a code reader (12) and an auxiliary reader (24), respectively. Along the travel path, the code carrier (11) and the code reader (12) are disposed counter to one another. To enable increasing the length of the addressable travel paths without losing positional accuracy, or without having to increase the number of code marks (18) in one code word (35), a block identification (22) is associated with the blocks (17). From the block identification (22), an auxiliary reader (24) can recognize whether the code reader (12) is reading only code marks (18) from one block (17). In this way, the travel path can be divided into important zones (27), in which the accurate position of the vehicle must be known, and to which blocks (17) must therefore be assigned, and unimportant zones (28), which are merely gaps (19) between blocks that connect the important zones (27) to one another.

36 Claims, 13 Drawing Sheets

|    | $Q_5$ | $Q_4$ | $Q_3$ | $Q_2$ | $Q_1$ |
|----|-------|-------|-------|-------|-------|
| 1  | 0 | 0 | 0 | 0 | 0 |
| 2  | 0 | 0 | 0 | 0 | 1 |
| 3  | 0 | 0 | 0 | 1 | 1 |
| 4  | 0 | 0 | 1 | 1 | 0 |
| 5  | 0 | 1 | 1 | 0 | 0 |
| 6  | 1 | 1 | 0 | 0 | 1 |
| 7  | 1 | 0 | 0 | 1 | 0 |
| 8  | 0 | 0 | 1 | 0 | 1 |
| 9  | 0 | 1 | 0 | 1 | 1 |
| 10 | 1 | 0 | 1 | 1 | 0 |
| 11 | 0 | 1 | 1 | 0 | 1 |
| 12 | 1 | 1 | 0 | 1 | 1 |
| 13 | 1 | 0 | 1 | 1 | 1 |
| 14 | 0 | 1 | 1 | 1 | 1 |
| 15 | 1 | 1 | 1 | 1 | 0 |
| 16 | 1 | 1 | 1 | 0 | 1 |
| 17 | 1 | 1 | 0 | 1 | 0 |
| 18 | 1 | 0 | 1 | 0 | 1 |
| 19 | 0 | 1 | 0 | 1 | 0 |
| 20 | 1 | 0 | 1 | 0 | 0 |
| 21 | 0 | 1 | 0 | 0 | 0 |
| 22 | 1 | 0 | 0 | 0 | 1 |
| 23 | 0 | 0 | 0 | 1 | 0 |
| 24 | 0 | 0 | 1 | 0 | 0 |
| 25 | 0 | 1 | 0 | 0 | 1 |
| 26 | 1 | 0 | 0 | 1 | 1 |
| 27 | 0 | 0 | 1 | 1 | 1 |
| 28 | 0 | 1 | 1 | 1 | 0 |
| 29 | 1 | 1 | 1 | 0 | 0 |
| 30 | 1 | 1 | 0 | 0 | 0 |
| 31 | 1 | 0 | 0 | 0 | 0 |

Fig. 4

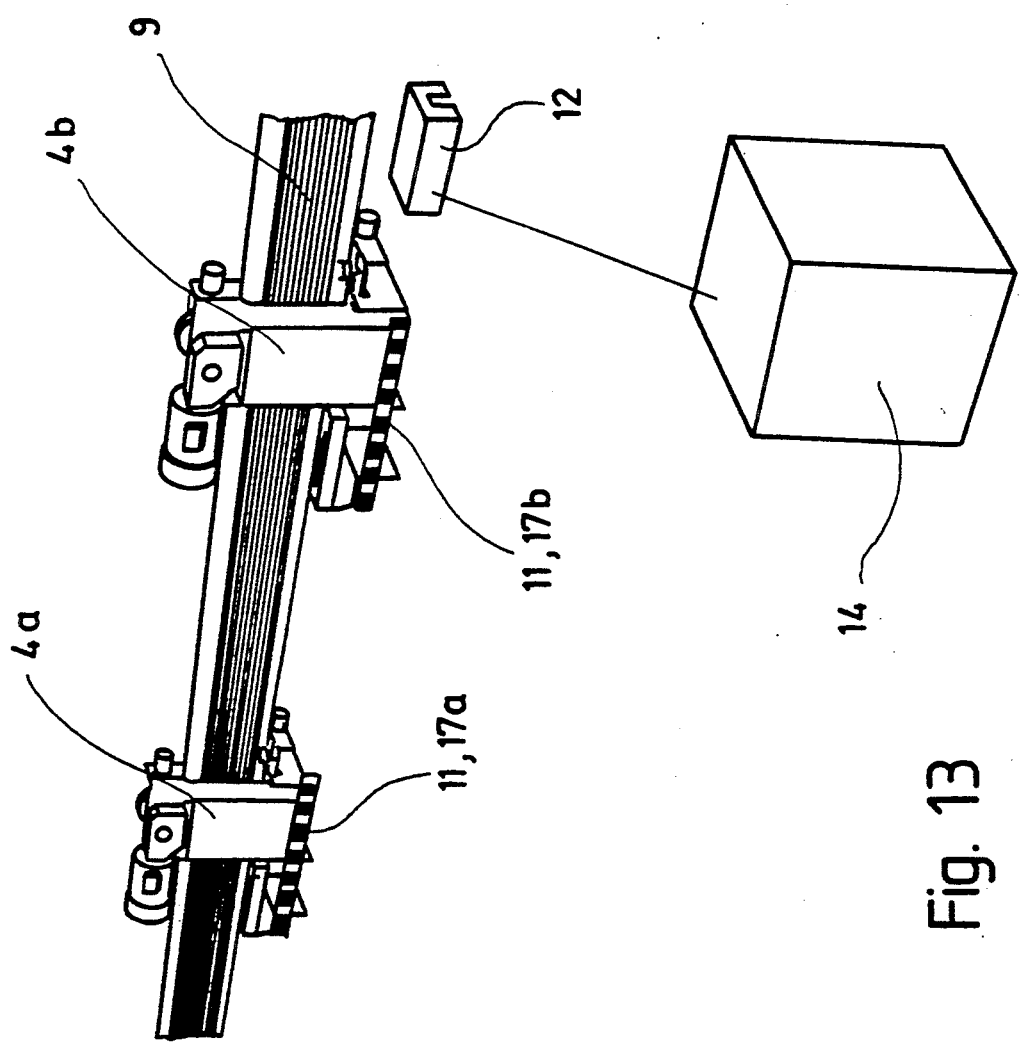

POSITION INDICATING APPARATUS FOR CRANE WAYS, OVERHEAD CONVEYORS, AND THE LIKE

Reference to related application, assigned to the assignee of this application, the disclosure of which is incorporated by reference:
U.S. Ser. No. 07/383,325, filed Jul. 20, 1989, Lanfer et al (FF 89 0538, PA 49 USAsg, P 38 25 097).

FIELD OF THE INVENTION

The invention relates to an apparatus for positioning crane ways and electric overhead conveyors and the like, and more particularly for indicating the position of a transport carrier on a rail or track, especially on an overhead rail or track, which carries code markings.

BACKGROUND

European Patent 0 116 636 discloses a positioning device for determining the relative position of two parts movable relative to one another. One of the two parts has a gap-free sequence of binary code marks of equal length. Each n sequential code marks form a binary code word of n places; each code word to be formed thus occurs only once. A sequence of code marks of this kind can be produced as a binary pseudo-random sequence with the aid of a feedback shift register.

A code scanner is provided on the other part, capable of detecting at least n sequential marks. A plurality of sensors is provided for this purpose for each code mark.

In this known position indicating apparatus, one code word defines a particular relative position of the two parts to one another. The length of the code marks measured in the direction of motion and the number of maximum possible code words define the maximum length of the path that can be addressed with code words.

The accuracy with which the position can be measured, or in other words the resolution, depends on the length of the code marks, unless further measures are taken. For the sake of accurate positioning, this length must therefore be selected to be as short as possible.

If the known positioning apparatus is used for crane ways or for overhead conveyors, the entire travel path has to be addressed. This means code words of many places, or digits. The maximum travel path is essentially limited by the sum of the lengths of all the code marks appearing in the pseudo-random sequence, even if there are many path segments in which the accurate position of the particular vehicle need not be known.

If the travel path is to be lengthened, then either the place number n of the code words, or the length of the code marks, must be increased. The first provision increases the expense for apparatus for reading the code words, or requires a higher order production polynomial for the code mark sequence; the latter provision reduces the resolution capacity.

SUMMARY OF THE INVENTION

It is therefore an object of the invention to provide a position indicating apparatus that makes it possible to provide a longer travel path than one equivalent to the sum of the lengths of all the code marks appearing in the pseudo-random sequence, without either reducing the resolution capacity in position recognition or using a higher order polynomial.

This and other aspects of the invention are attained by a position indicating apparatus for vehicles travelling along defined paths, such as crane ways and overhead conveyors, which have at least one running rail along which a vehicle travels. The apparatus includes a code carrier located in a travel path direction of the vehicle and extending in that direction, on which code carrier a plurality of code marks are formed. The code marks are detected by a code reader, with the code carrier and code reader means being movable relative to one another in the travel path direction. An evaluation means is coupled to the code reader for evaluating the code marks read by the code reader. Respective portions of the plurality of code marks form blocks, with each of such portions comprising at least one code mark that succeed one another in sequence. Each of the blocks is assigned an identification, and an auxiliary code reader detects the assigned block identification. The evaluation means receives the output of the auxiliary code reader to determine whether the output of the code reader corresponds to only code marks of one of the blocks.

In the novel position indicating apparatus, by combining sequential code marks into blocks which are assigned a block identification, it becomes possible to provide gaps between the blocks, in which addressing need not be performed.

The travel path can accordingly be divided into important zones, in which the accurate position of the vehicles must be known, and intermediate zones that join the important path segments. In the important zones, blocks are provided, while the intermediate zones represent gaps.

In principle, two embodiments can be used for the disposition of the code carriers, which carry the code marks combined into blocks, and code readers, which serve to detect the code words, as follows:

In the first embodiment, the blocks in the important zones along the travel path are provided at stationary code carriers, and the code readers are placed on the vehicles. In a simple manner, the length of the available travel path is thus increased. The number of code readers and thus the number of vehicles can also be subsequently changed at any time.

In the second embodiment, the code readers are positioned in stationary fashion in the zones, and the code carriers with the blocks are located on the vehicles. In this version it is possible at any time to provide additional code readers and thus to increase the number of zones in which the position of the vehicles must be known precisely. Assigning the blocks uniquely to the vehicles makes vehicle identification simple.

A combination of the two embodiments is likewise possible.

Within one block, the code marks in the single track are located beside one another in the order in which they are produced in the iteration with the generating polynomial. The blocks are located along the travel direction beside one another in such a way that the last code word of one block is produced before the first code word of the next block, in the iteration with the generating polynomial.

This arrangement of code words and blocks enables simple determination of the current vehicle position, without having to move the vehicle beforehand for that purpose.

There are various options to enable distinguishing the gaps from the blocks. A parallel track can be assigned to the blocks and sampled by a sensor of the auxiliary reader. In cases in which it is not possible to dispose a parallel track to the code carrier, the block identification is provided in the track of the block.

If the block identification is in the track of the block, the code reader and the auxiliary reader can operate by the same physical principle, or by different physical principles. If the code reader and the auxiliary reader operate by different physical principles, then the block identification extends uniformly over the entire block.

BRIEF DESCRIPTION OF THE DRAWINGS

FIG. 4 is a chart of the code words or numbers to be generated sequentially with the shift register of FIG. 3, along with the associated code word number;

FIG. 13 shows a perspective view of a crane arrangement with a positioning indicating system having one stationary code reader and having code carriers provided on the vehicle.

DETAILED DESCRIPTION OF THE PREFERRED EMBODIMENTS

Figure 1:
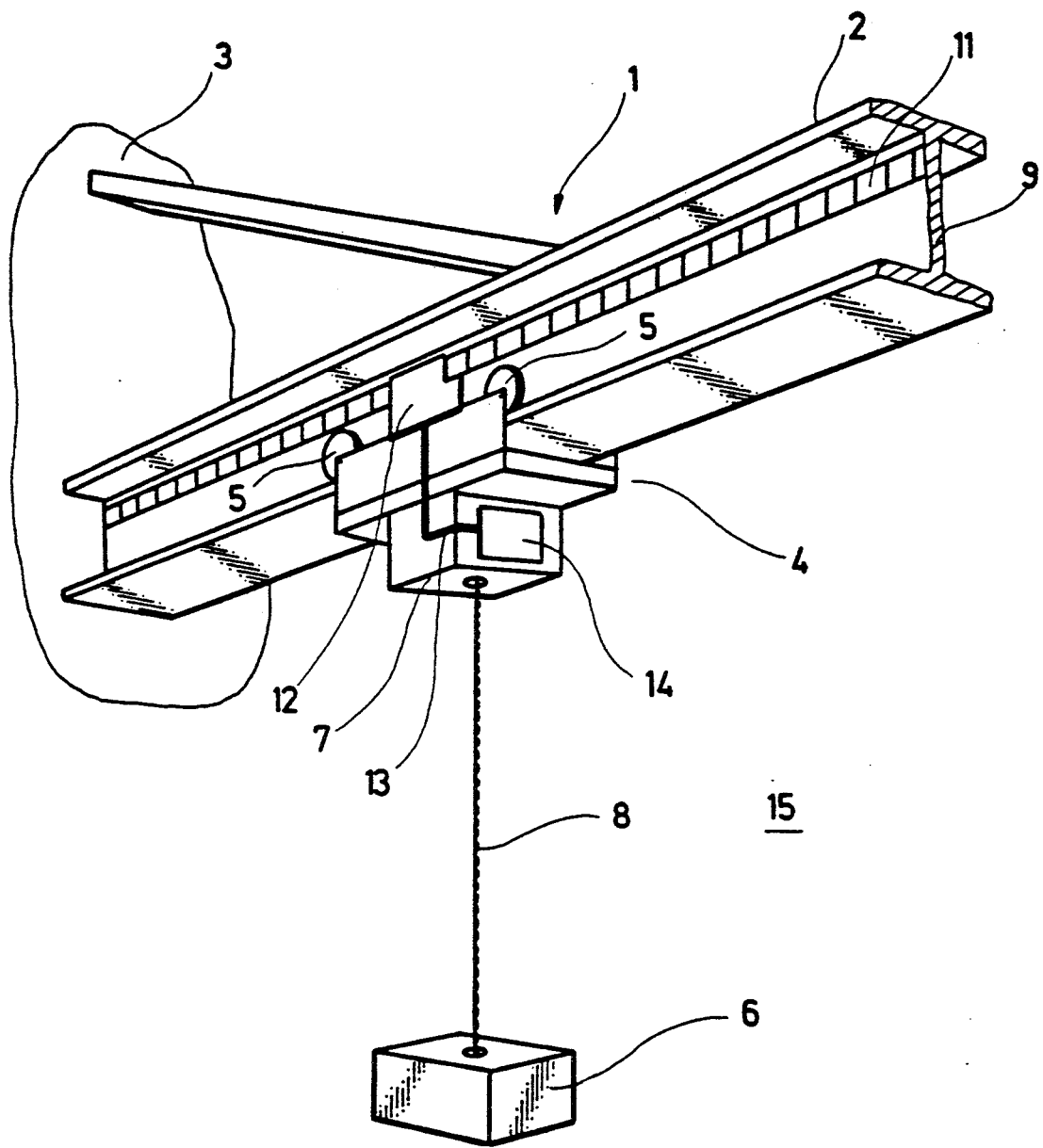
FIG. 1 shows a perspective view of a crane arrangement with a position indication system according to the invention.

A crane 1 shown in FIG. 1 has a boom and a horizontally extending running rail 2 in the form of an I beam, which projects on one end from a wall 3, not shown in detail. A transporting unit configured as a crane trolley 4 can run along the running rail 2; the trolley can be moved lengthwise in the longitudinal direction of the running rail 2 by means of track rollers 5, at least one of which can be driven by a drive device, not shown. The crane trolley 4 is provided with a conventional hoist 7 for raising and lowering, and loads 6 can be attached to its traction mechanism 8.

A code carrier 11 is attached to a crosspiece 9 of the I shaped running rail 2 and extends over the entire length of the running rail 2, not all the length of which is shown. A code reader 12 provided in the crane trolley 4 cooperates with this code carrier 11; thus marks stored on the code carrier 11 are read by code reader 12 when the crane trolley 4 moves lengthwise along the running rail 2. The code reader 12 is joined to an electronic evaluating unit 14 by a lead 13, and this unit further transmits the determined data to a central control apparatus 15 by means of slide contacts and busbars which are introduced on the opposite side of the crosspiece 9. The control circuit 15 stops or starts the drive device of the crane trolley 4 depending on the position that is reached. The slide contacts for the drive mechanism are also provided on the back side of the crosspiece 9 and are thus not visible in the drawing.

Figure 2:
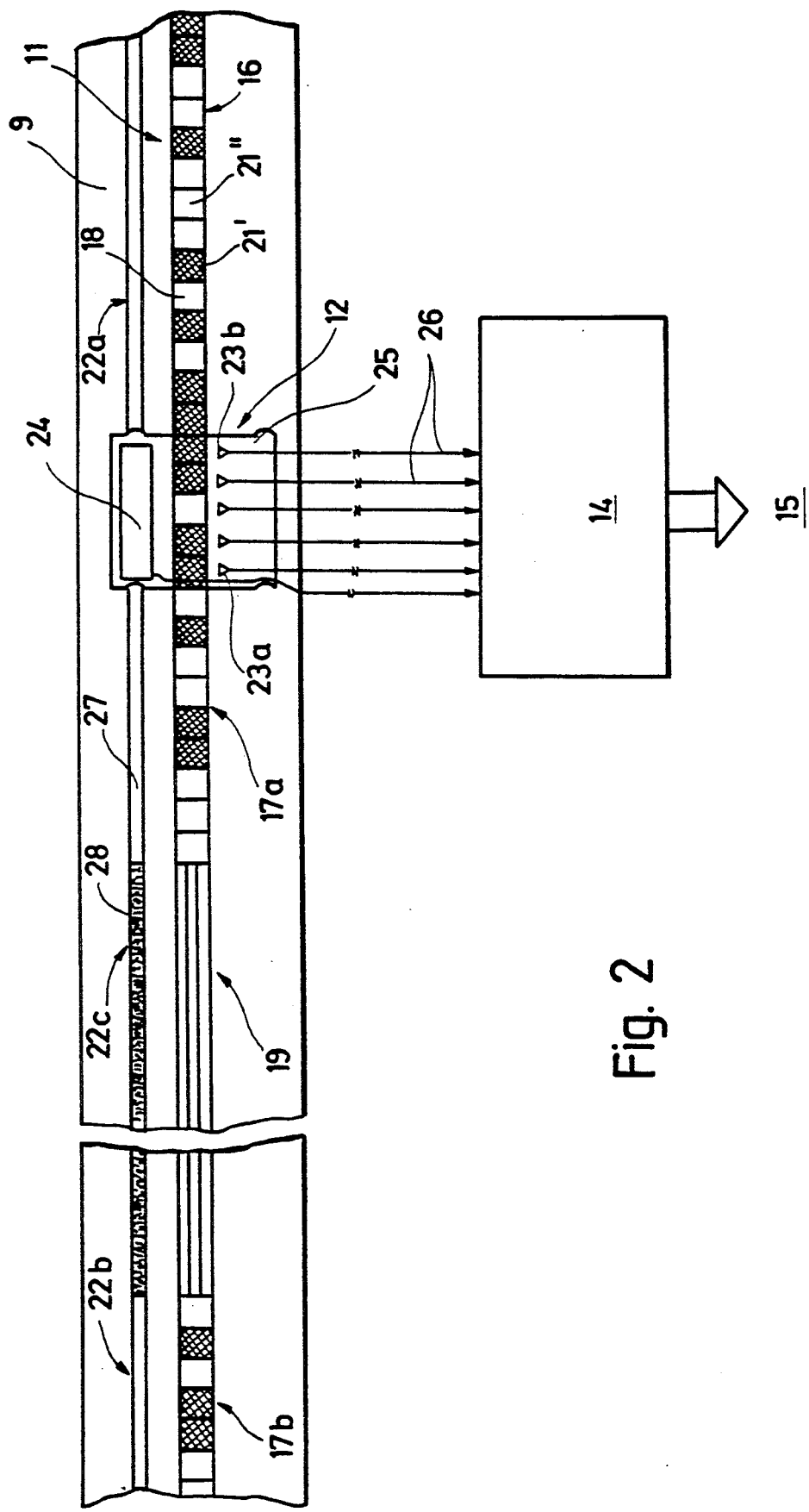
FIG. 2 shows a section of the running rail of the crane of FIG. 1, showing the code carrier and a block identification, formed as a parallel track, with the associated readers, each shown highly schematically.

Part of the crosspiece 9 is shown in section in an enlarged and somewhat schematized view in FIG. 2. Here, the code carrier 11 consists of a longitudinal band 16, which is secured on the crosspiece 9 and extends over the entire length of the running rail 2. It carries code marks 18 joined in one track to blocks 17a, 17b... (referred to below collectively as block 17). The blocks 17 are separated from one another by a gap 19. Rectangular fields, or areas, 21', 21"... (referred to below collectively as blocks 21) of equal size, which symbolize the various code marks 18, can be seen in the blocks 17. The gap 19 has no code marks 18.

A block identification 22a, 22b... (referred to collectively as block identification 22) in the form of a track parallel to the band 16 is attached to the crosspiece 9. The block identification 22 is divided into two zones 22a, 22b, which have the same longitudinal length as the blocks 17a, 17b, and one zone 22c, which has the same longitudinal length as the gap 19.

The code carrier 11 is scanned and read by the code reader 12, which has reading stations 23a, 23b... (referred to collectively as reading stations 23). The block identification 22 is scanned by an auxiliary reader 24, which extends over the entire length of the code reader 12.

The reading stations 23 and the auxiliary reader 24 are secured on a common frame 25, which is joined to the crane trolley 4 and is moved along with the trolley 4 parallel to the code carrier 11 and to the block identification 22. The reading stations 23—which are five in number in the exemplary embodiment shown—and the auxiliary reader 24 are each connected via connecting leads 26 to the evaluation unit 14, which reports its data to the central control apparatus 15.

The code carrier 11 shown is a so-called reflexive code carrier, which depending on the value of the code mark 17 reflects more or less light from an illuminating device, not shown in further detail, to the reading stations 23 of the two readers 12, 24. In the example shown, the reading stations 23 and the auxiliary reader 24 are formed as reflexive photoelectric barriers. The fields 21 either absorb light, like the field 21', or are reflective, like the field 21"; in this way, two different values, "0" or digital zero and "1" or digital one can be represented. For example, the value "0" is assigned to the absorbing field 21', and the value "1" is assigned to the reflective field 21". The block identification 22a, 22b in the zone of the blocks 17a, 17b is provided with a reflective field 27. This can be assigned the value "1", for example. In the zone of the gaps 19, the block identification 22c is provided with an absorbing field 28. The value "0" can for instance be assigned to the fields 28.

The blocks 17 end or begin at the same point as the reflective fields 27 of the block identification 22. The auxiliary reader 24 indicates a "1" only if it is located in its entire length over a field 27 of the block identification 22. The auxiliary reader 24 has the same longitudinal length as the code reader 12. The beginning of the auxiliary reader 24 coincides with the left reading station 23a, and the end of the auxiliary reader 24 coincides with the right reading station 23b. This means that the reading stations 23 read code marks 18 from the blocks 17 only when the auxiliary reader 24 furnishes a "1" to the evaluation unit 14. Even if the auxiliary reader 24 only reads partly from the field 28, or in other words at least some reading stations 23 are located above the gap 19, the auxiliary reader 24 will furnish a "0" to the evaluation unit 14, which thereupon reports to the control circuit 15 that the code reader 12 is not furnishing valid data.

Instead of the reflexive code carrier 11, a transmissive code carrier may also be used; in that case, the illuminating device and the readers 12, 24 are located on different sides of the code carrier 11, and the light transmitted by the code carrier is evaluated. In that case, the reading stations 23 may be spaced photoelectric detectors.

Each reading station 23 in FIG. 2 symbolizes three equidistantly arranged sensors. In actual practice it cannot be assumed that all the reading stations 23 will abruptly change their reading state exactly at the same time, or in other words synchronously; it is more likely that one reading station may be slightly ahead of some other. Because three sensors are provided for each code mark, at least two adjacent sensors will indicate the same value, so that the actual code mark sequence can be ascertained from the signals read. More detailed information on the arrangement of the reading stations 23 and on the evaluation circuits can be found in U.S. Ser. No. 07/383,325 filed Jul. 20, 1989

To enable unequivocal reading of the position of the trolley crane 4 along the running or travel rail 2 with the code marks 18 located in a track one after the other, five of which, immediately adjacent to one another, are read simultaneously, each arbitrary group of five adjacent code marks 18 along the running rail 2 must be unique; that is, this group must occur only once along the running rail 2. For a group of five adjacent code marks 18, the term "code word" will now be used.

A five-place bit sequence can be read with five reading stations 23; combined as a number, their largest value would be 31, so that a total of 32 different numerical values can be distinguished. Expressed in general terms, $N=x^m$ different numbers can be represented, where x represents the value of one numerical place, and m represents the number of numerical places. The largest number that can be represented is accordingly $N=x^m-1$. That is, the larger the number of reading stations 23, the more different numbers and hence the positions of the trolley crane 4 can be distinguished from one another. The resolution of the positioning accuracy is essentially based on the length of a code mark 18 in the longitudinal direction of the running rail 2, because the reading station 23 can be stopped arbitrarily within a code mark, without any change in the digit read.

It will be understood that for this reason a much larger number of reading stations 23 will be used in actual practice, to enable a positioning accuracy of 1 cm, for example, given the lengths of running rails 2 used in industry. The indicated number of reading stations 23 is therefore merely an example, and it is low in this example, so as not to make the explanation unnecessarily complicated. Numerical sequences that meet the above condition, that is, that each number occur only a single time within the sequence, are known as pseudo-random numbers. As is well known, they can be generated by the theory of "primitive polynomials" with the aid of a linear feedback shift register, the number of places of which corresponds to the number of places in the binary code word.

Figure 3:
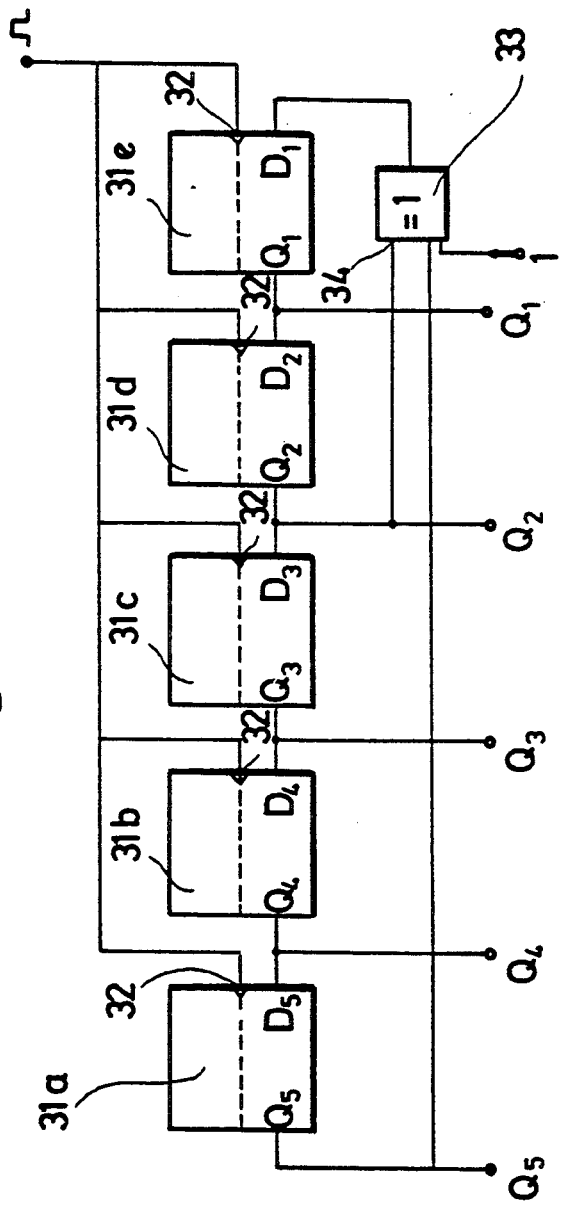
FIG. 3 shows a five-place feedback shift register for producing a pseudo-random numerical sequence, in which each number occurs only once within the sequence.

The generating shift register for a five-place code is shown in FIG. 3. It includes a total of five D flip-flops 31a . . . 31e, the clock inputs 32 of which are connected in parallel, so that they change their state simultaneously. The state they assume after the clock pulse at any given time depends on the state of the Q output of the particular preceding flip-flop 31a . . . 31e, because the D input of the flip-flop 31a is connected to the Q output of the flip-flop 31b; the D input of the flip-flop 31b is connected to the Q output of the flip-flop 31c, and so forth, through to the flip-flop 31e. A modulo-2 summing device 33 having three inputs 34 is connected to the D input of the flip-flop 31e; of these inputs, one is connected to the Q output of the flip-flop 31d and the second is connected to the Q output of the flip-flop 31a, while a binary "1" is continuously fed into the third input. A modulo-2 summing device 33 has the property that its output emits a logical 1 when, and only when, an uneven number of its input connections is in the state of logical 1.

Now if all the D flip-flops 31a . . . 31e are reset before the first timing or timing pulse is fed, or in other words if a digital low signal, L, is present at their Q output, then two of the inputs 34 of the modulo-2 summing device 22 are likewise at L, while the third input receives a digital high signal, H, so that the output of the modulo-2 summing device 33 also carries an H level, which is supplied to the D input of the flip-flop 31e. After the clock pulse decays, the flip-flop 31e is therefore in the one state, while the other flip-flops continue to be in the zero state. After the second clock pulse, the two flip-flops 31e and 31d are in the one state, while the other flip-flops continue to have the zero state. Since the modulo-2 summing device 33 now receives an H signal at two of its inputs 34, its output changes to L; that is, upon the next clock pulse, the shift register draws in a zero, and the flip-flop 31e is in the zero state. The two flip-flops 31c and 31d are in the 1 state, while the flip-flops 31a and 31b are again in the 0 state. The other states that the flips-flops 31a . . . 31e can assume in the ensuing sequential clock pulses are shown in the table of FIG. 4. As the table shows, each five-place binary digit occurs only once within a period length of a total of 31 numbers. The bit sequence 11111 is not included in the period of the feedback shift register of FIG. 3.

Figure 5:
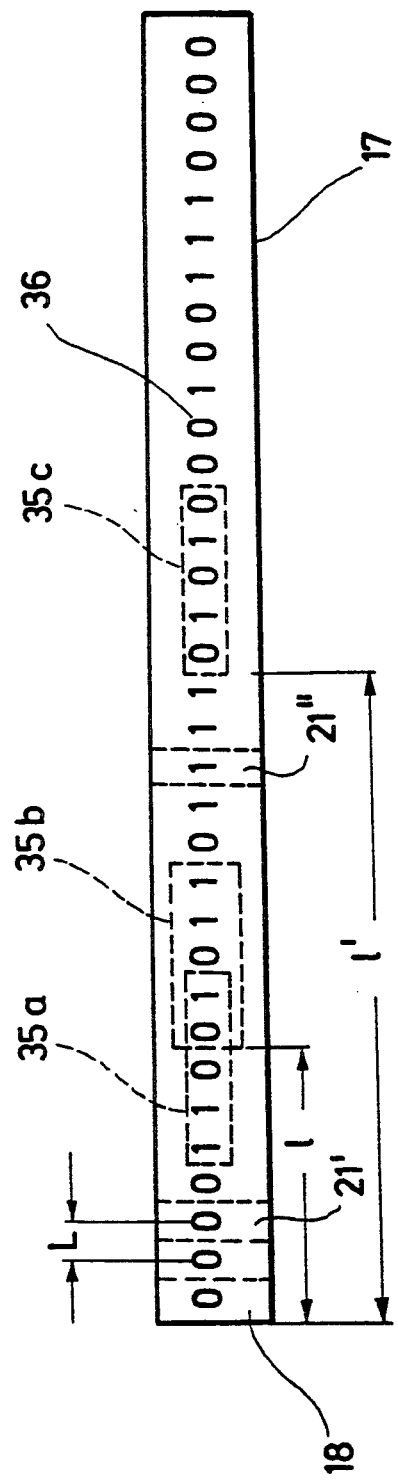
FIG. 5 shows code markings sequentially located on a code carrier, of the kind generated sequentially by the output Q4, for example, of the shift register of FIG. 4.

If the binary digits occurring sequentially at the Q output of the flip-flop 31b are now inscribed from left to right, the result is the code mark sequence shown in FIG. 5, which is concluded by three additional zeroes. Five sequential binary digits at a time in FIG. 5 represent a code word 35a, 35b . . . (referred to collectively below as code word 35) from the table in FIG. 4. Each of these code words 35 occurs only once in FIG. 5. The two code words 00000 and 11111 that are likewise possible do not occur in FIG. 4; they are reserved for the gaps.

The binary digits 36 written down in FIG. 5 represent the code marks 18, which are here combined into a block 17. A 0 corresponds to a field 21', and a 1 corresponds to a field 21" of FIG. 2. The spacing between centers of two adjacent code marks 18 is L. It is equivalent to the length of a code mark.

For each code word 35 read from FIG. 5, its place in order can be unequivocally decided from the table of FIG. 4. This makes it possible to decide how many steps are necessary in order to proceed from the code word 00000 to the particular code word 35 read out from the table in FIG. 4. The five-place bit sequence of reference numeral 35a is equivalent to the code word numbered 6 in the table of FIG. 4, as an example. Correspondingly, the bit sequence 35b has the code word number 9, and the bit sequence 35c has the code word number 19.

Now in order to calculate the distance of the bit sequence 35 from the beginning of the block 17, the corrected code word number must be multiplied by the center spacing L, and it must also be taken into account that the code words 00000 and 11111 do not occur in the block 17. The distance of the bit sequence 35b from the beginning of the block 17 can accordingly be calculated as: $1 = L \times (9-2)$. Correspondingly, the distance of the bit sequence 35c from the beginning of the block 17 is $1' = L \times (19-2)$.

From the code word read, it is accordingly possible to ascertain unequivocally where the trolley crane 4 is located along the block 17.

In FIG. 5, the block 17 extends over the entire travel path available. According to the invention, the travel path can now be divided into zones 37a, 37b . . . (referred to collectively below as zones 37) of importance, in which the position of the vehicles must be known, and unimportant zones 38a, 38b . . . (referred to collectively below as zones 38), which join the zones 37 to one another. This is illustrated highly schematically in FIG. 6, taking the example of a branched travel path.

Figure 6:
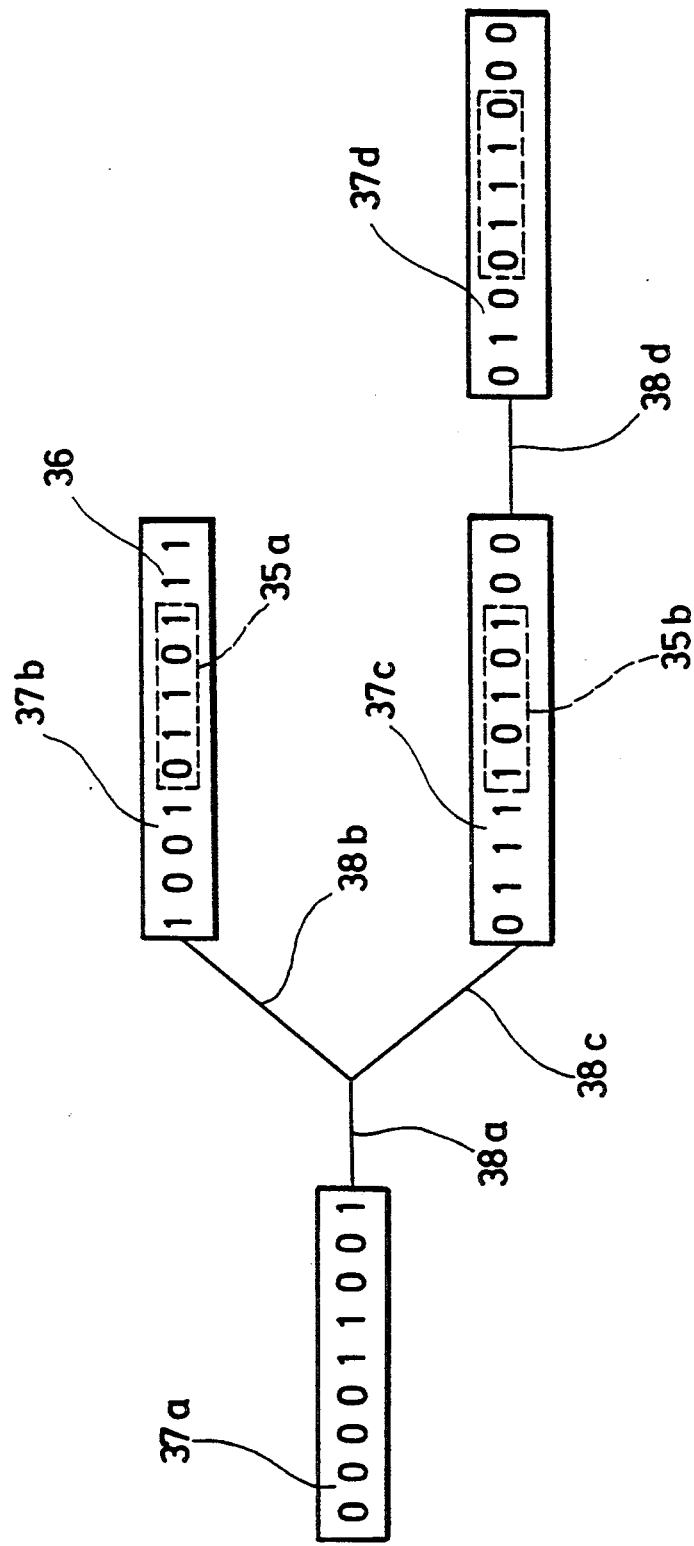
FIG. 6 is a highly schematic view of a branched travel path, divided into blocks and gaps.

In the zones 37, there are code marks 18 that are combined into blocks 17. In FIG. 6, as in FIG. 5, the code marks are symbolized by the binary digits 36. In the ensuing discussion, the same reference numerals are used for the blocks associated with the zones 37 as for the zones 37 themselves. No code marks are present in the zones 38; these zones represent gaps 19. In the ensuing discussion, the same reference numerals are used for the gaps themselves as for the zones 38.

As in FIG. 5, each code word in FIG. 6 occurs only once along the branched travel path. Block 37a contains the code word having the numbers 2-6; block 37b contains the code word having the numbers 7-13; block 37c contains the code word having the numbers 14-20; and block 37d contains the code word having the numbers 25-30. The code word numbers are equivalent to the numbers in the table of FIG. 4.

The addressing with five-place code words shown in FIG. 6 is merely an example. In actual practice, the number of places in a code word will be higher, to enable more accurate positioning within a block of given length, or optionally to enable forming more blocks.

It is assumed that a vehicle is located in zone 37b of the travel path, and the code reader 12 disposed on the vehicle reads the code word 35a from block 37b and delivers it to the evaluation unit 14. With the aid of the code word 35a, the position of the vehicle 4 can be determined as follows, referred to the beginning of the zone 37a:

The code word 35a has the code word number 11, according to the table of FIG. 4. If the gaps 38a and 38b are initially ignored, then the distance of the code word 35a from the beginning of the block 37a can be calculated precisely as described for FIG. 5. The corrected code word number must be multiplied by the center spacing L. This is permissible, because the code word of block 37b directly follows the last code word of block 37a. The length a of the gap 38a and the length b of the gap 38b must now be taken into account in a correction element. The distance $l_a$ of a vehicle the code reader 12 of which furnishes the code word 35a from the beginning of the zone 37a is thus calculated as follows: $l_a = L \times (11-2) + a + b$.

Now let it be assumed that the vehicle 4 is located in zone 37c, and that the code reader 12 reads the code word 35b. The code word 35b has the code word number 18. The distance of the vehicle 4 from the beginning of zone 37a can be calculated just as described above. However, it should be remembered that the code word of block 37c does not directly follow the last code word of zone 37a; instead, the code words from zone 37b are missing. Thus the length A of the zone 37b must be taken into account in the correction element. The distance 1 between the beginning of the zone 37a and the vehicle 4, the code reader 12 of which is reading the code word 35b, is accordingly calculated as follows: $1 = L \times (18-2) + a + c - A$. The length c represents the length of the gap 38c.

With a branched travel path divided into blocks and gaps, as schematically shown in FIG. 6, it is highly advantageous if the code words along the travel path are arranged in accordance with increasing code numbers from the table of FIG. 4. An evaluating electronic unit, not shown in detail, must then merely know which code mark numbers are to be found in which blocks, and what the lengths of the gaps between the blocks are. As explained above, the distance from a reference point, in this case the beginning of zone 37a, can be calculated in a simple manner from the code word numbers, with one correcting element associated with each block.

The code word number of the particular code word read, which must not be mistaken for a numerical value, is either taken from a memory or is generated fresh each time with a shift register as shown in FIG. 3.

The block identification of the blocks 37 schematically shown in FIG. 6 may be provided in a parallel track as shown in FIG. 2. The auxiliary reader 24 may extend over the entire length of the code reader 12.

Figure 7:
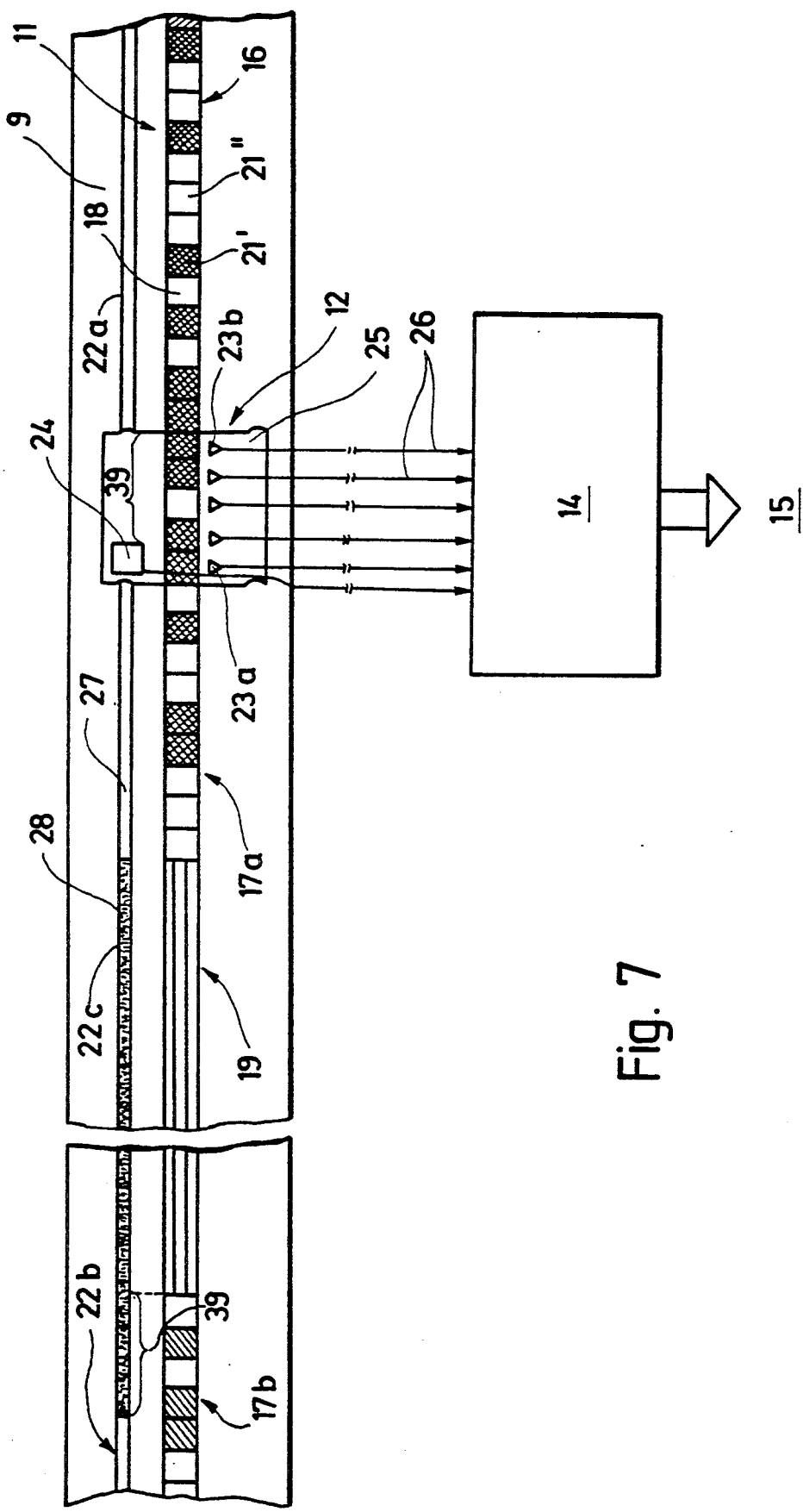
FIG. 7 is a view corresponding to FIG. 2, in which an auxiliary reader is considerably shorter than the code reader.

In a further embodiment shown in FIG. 7, the auxiliary reader 24 of FIG. 2 can also be considerably shorter than the code reader 12 and can be disposed asymmetrically with respect to the reading stations 23a. As in FIG. 2, the auxiliary reader 24 is flush on the left with the sensor 23a, but is shorter by the length 39 than the auxiliary reader of FIG. 2.

Since the auxiliary reader 24 and the code reader 12 are made to be flush at the left, the block 17a and the field 27 of the block identification 22 ar also arranged flush at the left.

Figure 9:
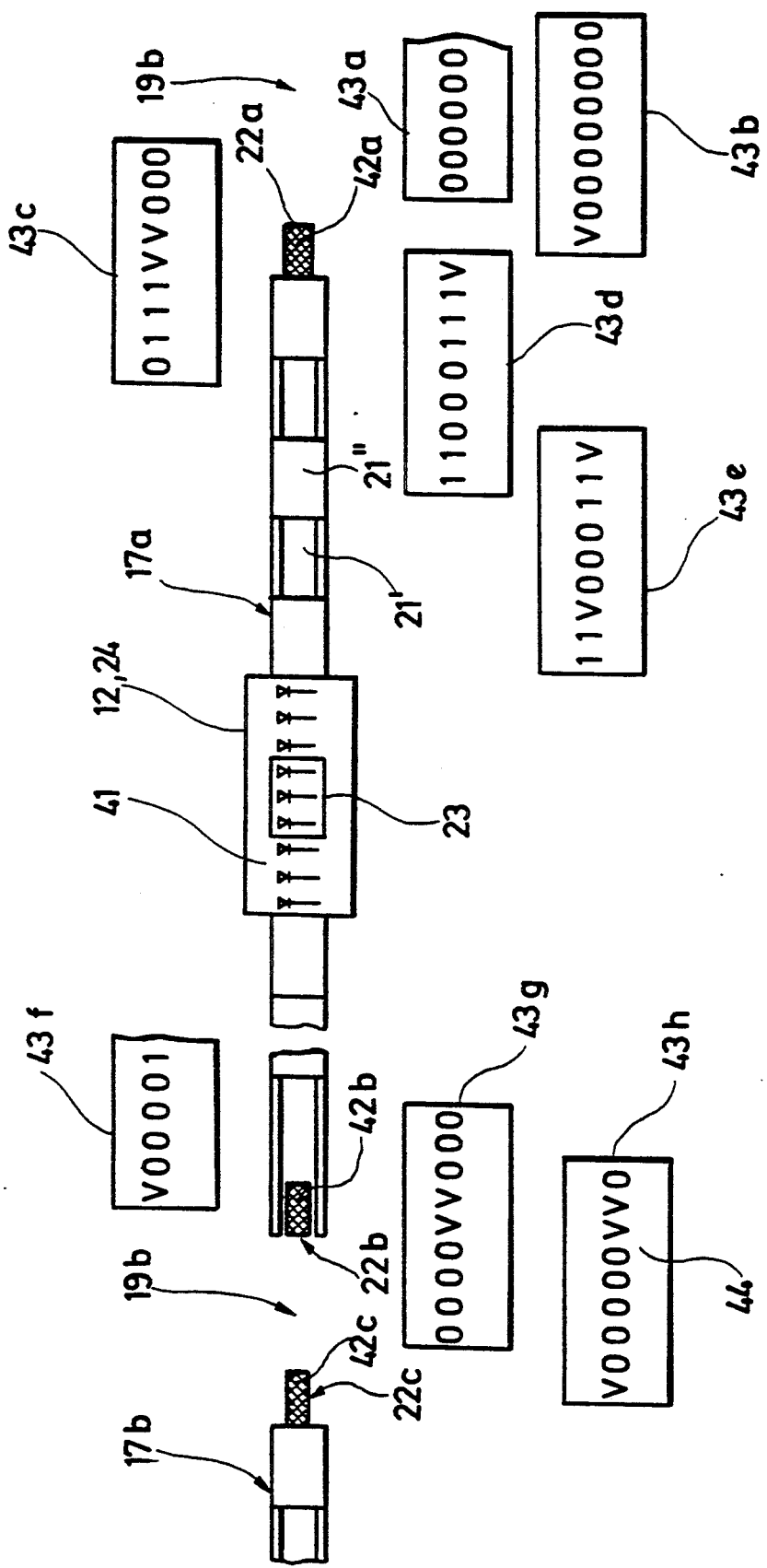
FIG. 9 is a view corresponding to FIG. 8, in which the auxiliary reader and the code reader operate by the same physical principle.

If a code reader, traveling from right to left of the arrangement shown in FIG. 9, comes from the gap 19 and enters the block 17b, then the auxiliary reader 24 must not be located completely above one field 27 until all the reading stations 23 have fully entered the block 17b. The field 28 of FIG. 7 therefore extends over block 17b to overlap it.

If the auxiliary reader 24 is positioned next to the code reader 12 or in other words to the left of the reading station 23a, the length 39 increases accordingly. Now, the field 28 protrudes further, overlapping by the new length 39 into the zone of the block 17b. The field 27 extends into the block gap 19 by the width of the auxiliary reader 24. If the code reader 12 is flush on the left at the beginning of the block 17a, then all of the auxiliary reader 24 is still located above the field 27 and reads a "1", and as a result indicates to the evaluation unit 14 that the signals furnished by the code reader 12 represent a valid code word. In the exemplary embodiment in FIG. 7, the auxiliary reader and the code reader can operate by different physical principles. For instance, as mentioned above, the auxiliary reader may include a reflexive photoelectric barrier, and the code reader may include inductive transducers. The markings 21' and 21" then have dissimilar permeability.

Other physical principles by which the reading stations can function are also possible. For instance, the auxiliary reader may include a mechanical end switch, and the block identification can switch the end switch on in the region of gaps and off in the region of blocks. The reading stations 23 of the code reader 12 may for instance detect capacitive effects and the code markings 21' and 21" may have different dielectric constants.

Figure 8:
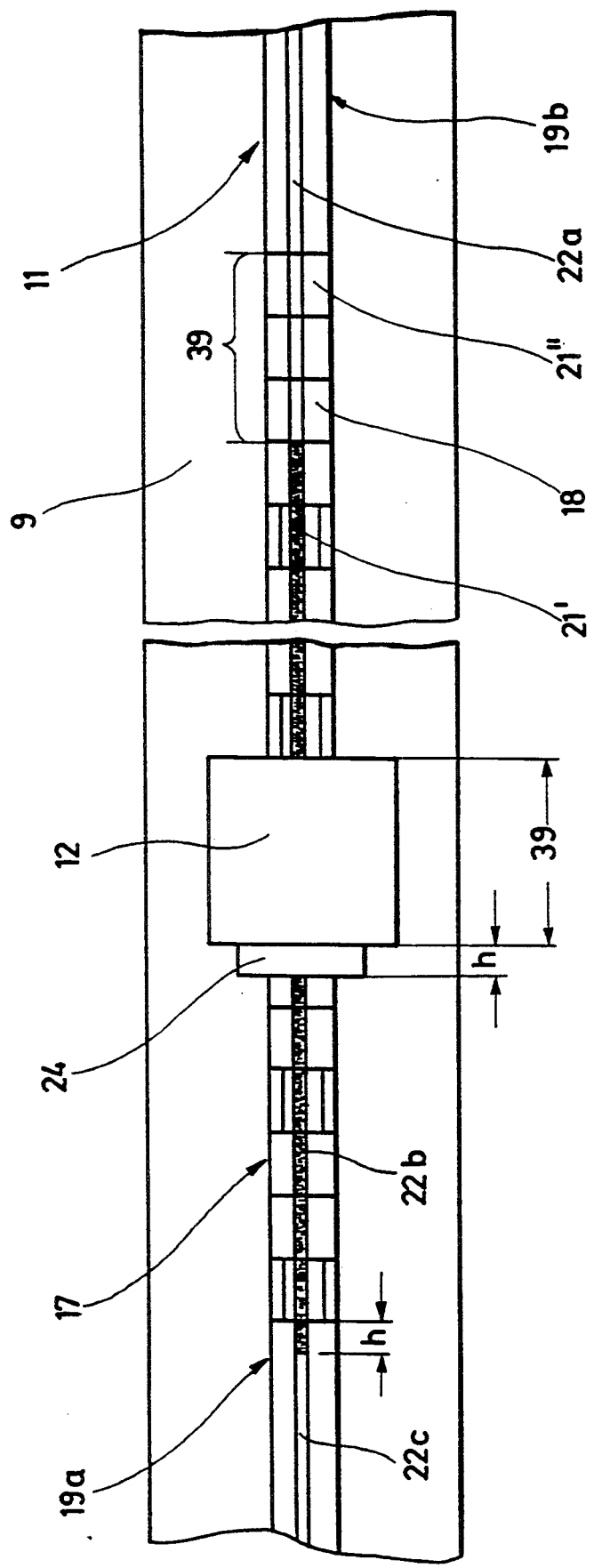
FIG. 8 is a view corresponding to FIG. 2, in which the block identification is located in the track of the block, and the two readers operate by different physical principles.

In a further exemplary embodiment shown in FIG. 8, the block identification 22 is located in the track of block 17. FIG. 8, in highly schematic fashion, shows a detail from the rail 9 on which the code carrier 11 is secured. Code marks 18 that are combined into a block 17 are provided along the lengths of the code carrier 11. The block 17 is bounded by two gaps 19a, 19b. The code marks 18 are scanned by the code reader 12, and the block identification 22 is read by the auxiliary reader 24. For the sake of simplicity, there is as little detail provided for the reading stations of the auxiliary reader 24 and of the code reader 12 as for the evaluation unit 14 connected to it. As in FIG. 2, the code carrier 11 may be a transmissive code carrier, which allows more or less light to pass though it depending on the value of the code mark. The auxiliary reader 24 operates by a different physical principle than the reading stations 23 of the code reader 12.

As in FIG. 7, the auxiliary reader 24 is disposed beside the code reader 12. The block identification 22b therefore extends by the width h of the auxiliary reader 24 past the block 17 into the region of the gap 19a. On the other end of the block 17, toward the gap 19b, the block identification 22b ends in the region of the block 17. The right-hand end of block 17 extends past the right-hand end of the block identification 22b by the length 39 of the code reader 12. As a result, it is assured that as in FIG. 7 the auxiliary reader 24 will read from the block identification 22b when the all the reading stations 23 of the code reader 12 are located above code marks 18 from the blocks 17.

The auxiliary reader 24 here operates by an inductive principle, for example, and the block identification 22b has a different permeability, in the region 22b logically associated with the block 17, from that in the zones 22a and 22c, which are associated with the gaps 19a and 19b.

The advantage of the arrangement shown in FIG. 8 is that the block identification 22 takes u little space, because it is not provided in the form of a parallel track next to the block 17.

Another exemplary embodiment for a block identification that is located in the track of the block is shown in FIG. 9, again highly schematically. In contrast to FIG. 8, the code reader 12 and the auxiliary reader 24 here operate by the same physical principle.

As in FIG. 8, a transmissive code carrier 11 is also shown in FIG. 9; it carries transparent code marks 21' and opaque code marks 21" that are combined into a block 17a. Adjoining the gap 19b is a further block 17b. The block identification 22 is provided here at the beginning and end of the block 17. The words "beginning" and "end" refer to the direction of the travel path and are arbitrary, serving merely to simplify the description.

Each reading station 23 of the code reader 12 includes three sensors 41, here in the form of spaced photoelectric detectors. As already mentioned, reading errors resulting from uneven division of the code marks 18 and/or a differing response among the sensors 41 can be corrected in this way. The auxiliary reader 24 is formed by the sensors 41 of the code reader 12.

In the vicinity of the gaps 19, the sensors 41 read the same code mark value as in the transparent code mark 21'. A "0" is assigned to the code mark 21'. Accordingly, sensors 41 located in the vicinity of the gap 19 read a "0".

The block identification 22 comprises an attenuator 42a, 42b... (referred to below collectively as attenuator 42), which here is realized in the form of a grid. The length of the grid 42 in the direction of the travel path is approximately equivalent to the center spacing of two adjacent sensors 41. If the block 17a ends with a "1" code mark 21", the grid 42a is located before the block 17a in the vicinity of the gap 19b. If the block ends with a "0" code mark 21', the grid 42b is located above the block in such a way that it ends with the beginning or end of the block. The grid is assigned the same reference numeral as the attenuator 42. The grids 42 attenuate the light of the transmitter in the spaced photoelectric detectors of the sensors 41 to such an extent that the sensors 41 indicate an intermediate state "V", which represents neither a "0" nor a "1". The signals of the code reader 12 furnish a reading pattern 43a, 43b... (referred to below collectively as reading pattern 43), in which the three logical states "0", "1", "V" can appear. The evaluation unit 14, not shown in further detail in FIG. 9, can decide from this reading pattern 43 in which zone of the travel path the code reader 12 is located, as follows:

In FIG. 9, the reading patterns 43 are shown in the correct position with respect to the blocks 17 and gaps 19. They indicate the logical signal level 44 that the sensors 41 of the code reader 12 furnish, in the corresponding positions.

The reference numerals of the reading patterns 43 will be used below as well for the various positions of a vehicle 4, the code reader 12 of which detects the associated reading patterns via its sensors 41.

It is assumed that a vehicle 4 leaving the zone of the gap 19b is entering the zone of the block 17a. In position 43a, the reading pattern includes a sequence of zeroes or "0"s. This reading pattern indicates that the vehicle is completely located within the zone of the gap 19b. If the vehicle continues on to position 43b, then the left-hand sensor 41 shows a "V" signal. This reading pattern is definitive for a position completely at the beginning of a block.

If the vehicle 4 moves onward into the block, then two adjacent "V" signals appear in the reading pattern 43c. Just like the position 43g, this position means that the vehicle is located in the transitional zone between the gap 19 and the block 17. Once the vehicle reaches the position 43d, then only the right-hand sensor 41 furnishes a "V" signal. This reading pattern represents a valid code word. It is distinguished from the position 43b, in which only a "V" signal also appears, in that "1"s appear as well as the "0"s. The same is true for the position 43f. With the aid of the two "V" signals appearing adjacent one another in position 43c, the precise position of the code reader with respect to the beginning or end of the block can be determined. For instance, in position 43c the sensors 5 and 6 counted from the left furnish the "V" signals. Accordingly, the vehicle has entered the block by the width of four sensors. The same applies for position 43g.

In position 43e, the vehicle is fully in the zone of the block 17a. Here it is assumed that two sensors are located precisely in the middle between a "0" and a "1" and reproduce a "V" signal. However, it is not possible for two adjacent sensors to represent a "V", and so all the reading patterns in which one or more isolated "V" signals occur and which additionally have "0"s and "1"s represent valid code words. The code word in position 43e is 101, for example.

The type of block identification 22 by means of grids 42 shown here makes it possible to make the gaps 19 between two blocks 17 so short that the code reader 12 simultaneously reads signals from one block 17a and another block 17b. This corresponds to the position 43h. The "V" at the beginning and the two "V"s next to one another indicate that the vehicle is located in the position 43h between two blocks 17a, 17b that are located very close together.

This type of block identification can be used particularly advantageously in regions where the travel path switches and branches off, because the spacing between various blocks can be quite short.

Figure 10:
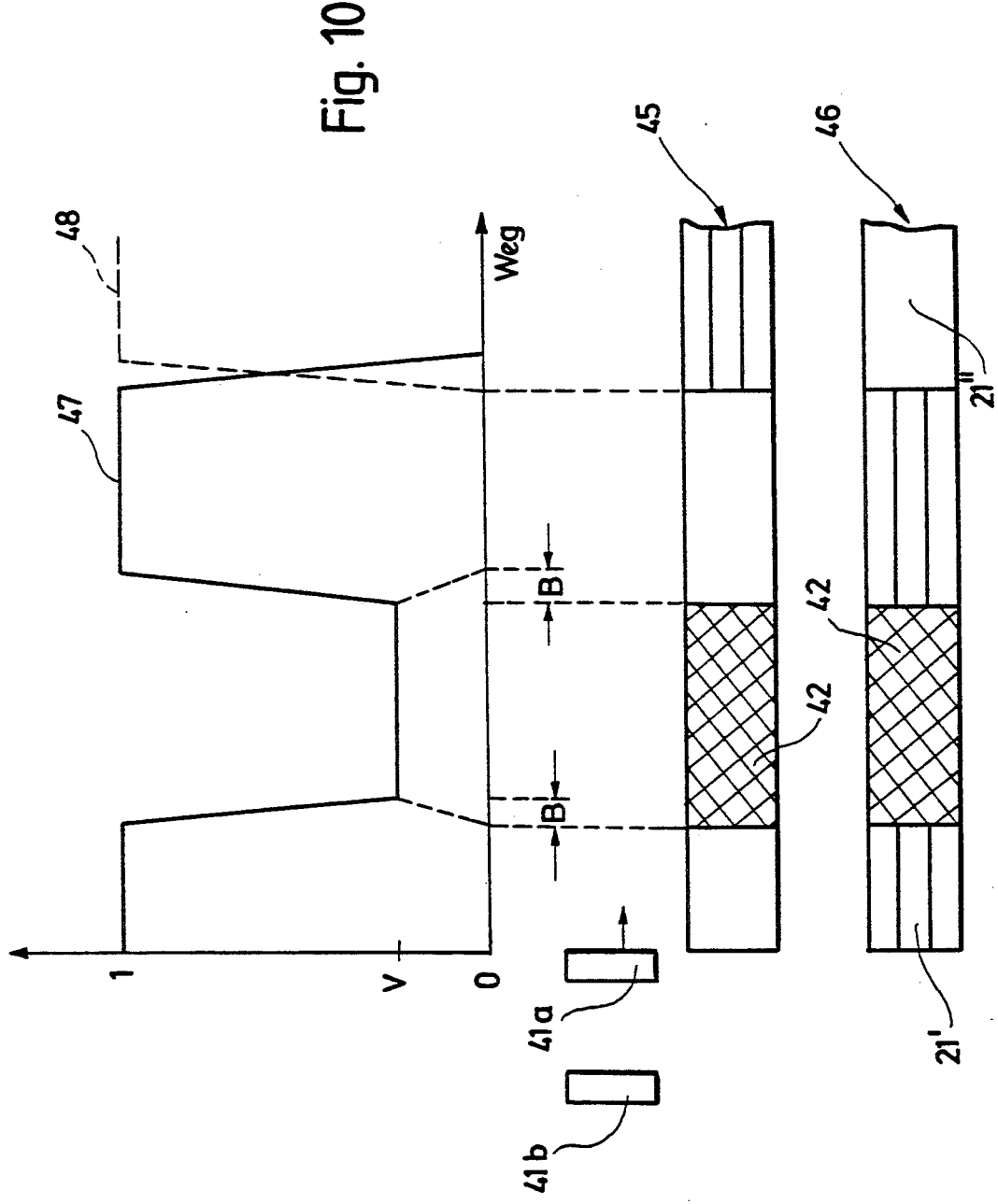
FIG. 10 is a diagram of the signal amplitude in a position indicating apparatus according to FIG. 9.

FIG. 10 shows the signal amplitude in the sensor 41 that is moved across the code mark sequence 45, 46. The code mark sequence 45 represents a signal level 47 of 1V10, and the code mark sequence 46 represents a signal level 48 of 0V01. It can be seen that the transition from one signal level to another takes place over the width b of the sensor 41. It can be seen that even at the transition from a "0" to a "2", a state occurs that is equivalent to the state "V". These are the reading errors assumed for the position 43e from FIG. 9. These reading errors cannot occur in two adjacent sensors 41a, 41b, however. Two adjacent sensors 41 will both indicate a "V" signal only when they are located above a grid 42.

Figure 11:
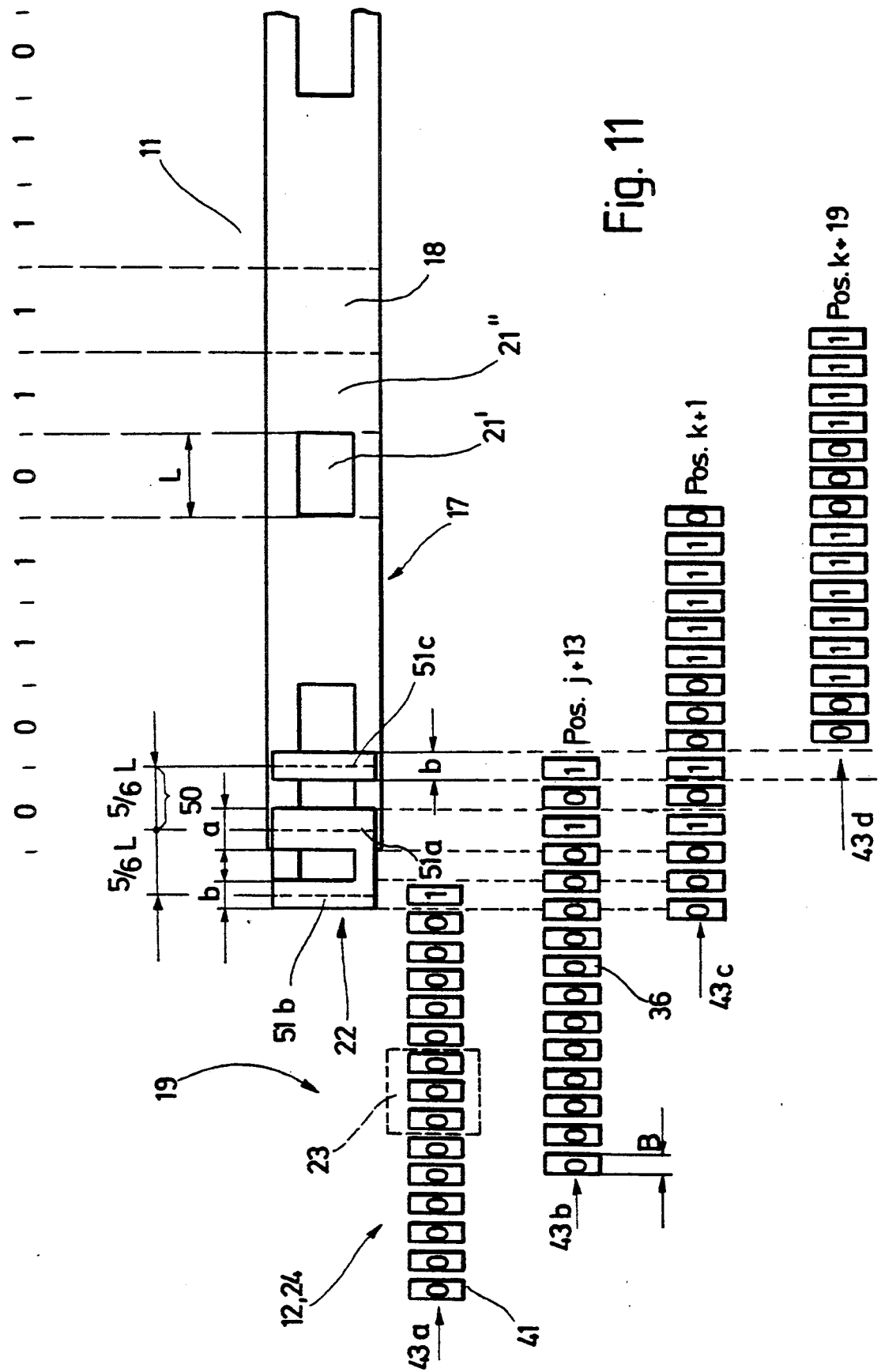
FIGS. 11 and 12 show a position indicating apparatus in which the block identification is provided in the track of the block, by an identification mark grid.

In FIG. 11, a further exemplary embodiment for a block identification 22 that is located in the track of the block 17 is shown in highly schematic fashion. As in FIG. 9, the code reader 12 and the auxiliary reader 24 operate by the same physical principle. The auxiliary reader 24 is formed by sensors 41 of the code reader 12. Each of the five reading stations 23 of the code reader 12 includes three sensors 41.

FIG. 11 shows the beginning of a block 17 that carries code markings 18 encoding a sequence of 0011011110. As above, the length of one code mark is L.

The block identification 22 comprises three identification marks 51a, 51b and 51c (referred to below collectively as marks 51), which are spaced apart from one another by a center spacing of 5/6 L. The beginning of the identification marks 51 coincides with the beginning of the first 0 code mark. The identification mark 51c is located approximately centrally above the second 0 code mark, counted from the beginning of the block. The center spacing 50 between the identification marks 51a and 51c, expressed in general terms, is $$\frac{2P+1}{6} L$$

where P is greater than 1. In FIG. 11, P=2.

The length of the identification marks 51 in the direction of the travel path is approximately one-third of L. The length b of the identification marks 51b is selected such that it always generates a "1" in only one sensor, which is positioned approximately centrally above the code mark 51b. This is shown in the reading pattern 43a. The same is correspondingly true for the identification mark 51c, as can be seen from the reading pattern 43b. If two adjacent sensors 41 are located above the identification 51b, then both sensors indicate a "0". This can be seen in position 43b. The same is correspondingly true for the identification mark 51c.

The length a of the identification mark 51a is selected such that it can generate a "1" in two adjacent sensors.

The effective length B of the sensors 41 in the plane of the code carrier 11 is considerable, in comparison with the length L of one code mark. In the light of the above, the following relationship exists for the length a of the identification mark 51a and the length b of the identification mark 51b, 51c:

$$a = \tfrac{1}{3}L + B + \Delta x, \text{ and } b = \tfrac{1}{3}L + B + \Delta y$$

The tolerances of B and L are taken into account in the correction elements $\Delta x$ and $\Delta y$.

Let it be assumed that a vehicle 4 is entering the zone of the block 17. The code reader 12 of the vehicle 4 then furnishes a code mark pattern, on which an identification mark pattern is superimposed. In FIG. 11, signals patterns 43 are shown for various positions of the code reader, referred to the block 17. In the vehicle positions associated with the reading patterns 43a, 43b, 43c, the vehicle is located in the transition zone between the gap 19 and the block 17. This is indicated to the evaluation unit 14 by a signal pattern 010 or 101. A signal sequence in which three sensors 41 next to one another indicate alternating values is possible only in the region of the block identification 22. If the code reader 12 reads signals of code marks 18, then at least two sensors 41 located next to each other of one reading station 23 will have the same logical signal value, as already mentioned above.

The following table lists the reading patterns 43 that occur upon entry of the vehicle 4 into the block. The various reading patterns 43 in the table differ in the number of steps by which the code reader has moved into the block. In this context, the term "step" is not intended to mean a constant length. Instead, the step width is variable, and is selected such that after each step, a signal change will have taken place in at least one of the sensors 41 of the code reader 12.

| Logical Value of the Sensors | Step | Code Word Valid | Code Word Invalid |
|---|---|---|---|
| 000 000 000 000 001 | j + 1 | | x (beginning) |
| 000 000 000 000 000 | ... + 2 | | x (gap) |
| 000 000 000 000 010 | ... + 3 | | x |
| 000 000 000 000 000 | ... + 4 | | x (gap) |
| 000 000 000 000 100 | ... + 5 | | x |
| 000 000 000 000 101 | ... + 6 | | x |
| 000 000 000 000 001 | ... + 7 | | x (beginning) |
| 000 000 000 001 001 | ... + 8 | | x |
| 000 000 000 001 011 | ... + 9 | | x |
| 000 000 000 000 010 | ... + 10 | | x |

-continued

| Logical Value of the Sensors | Step | Code Word Valid | Code Word Invalid |
|---|---|---|---|
| 000 000 000 010 010 | ... + 11 | | x |
| 000 000 000 010 110 | ... + 12 | | x |
| 000 000 000 000 101 | j + 13 | | x |
| 000 101 000 111 110 | k + 1 | | x |
| 010 100 000 111 111 | ... + 2 | | x |
| 000 100 000 111 111 | ... + 3 | | x |
| 100 101 000 111 110 | ... + 4 | | x |
| 101 101 001 111 110 | ... + 5 | | x |
| 101 000 001 111 110 | ... + 6 | | x |
| 001 000 001 111 110 | ... + 7 | | x |
| 001 010 011 111 100 | ... + 8 | | x |
| 011 010 011 111 100 | ... + 9 | | x |
| 010 000 011 111 100 | ... + 10 | | x |
| 110 100 111 111 000 | ... + 11 | | x |
| 100 000 111 111 000 | ... + 12 | x | |
| 101 000 111 111 000 | ... + 13 | | x |
| 001 001 111 110 001 | ... + 14 | | x |
| 000 001 111 110 001 | ... + 15 | x | |
| 010 011 111 100 011 | ... + 16 | | x |
| 000 011 111 100 011 | ... + 17 | x | |
| 100 111 111 000 111 | ... + 18 | x | |
| 001 111 110 001 111 | k + 19 | x | |

The step j+1 has a "1" at the edge; the code reader 12 is then located all the way at the beginning of the block 17. The reading pattern of the step j+2 and j+4 includes only "0"s. This reading pattern is associated with the gap 19 and is recognized as invalid. The reading patterns of steps j+3 and j+5 through j+13 have a 010 or 101 sequence and are likewise recognized as invalid.

The reading patterns of steps k+1 through k+11 as well as k+13, k+14 and k+16 have a 010 or 101 sequence and are correspondingly invalid as well. Step k+12, k+15 and k+17 through k+19, contrarily, are valid code marks.

Figure 12:
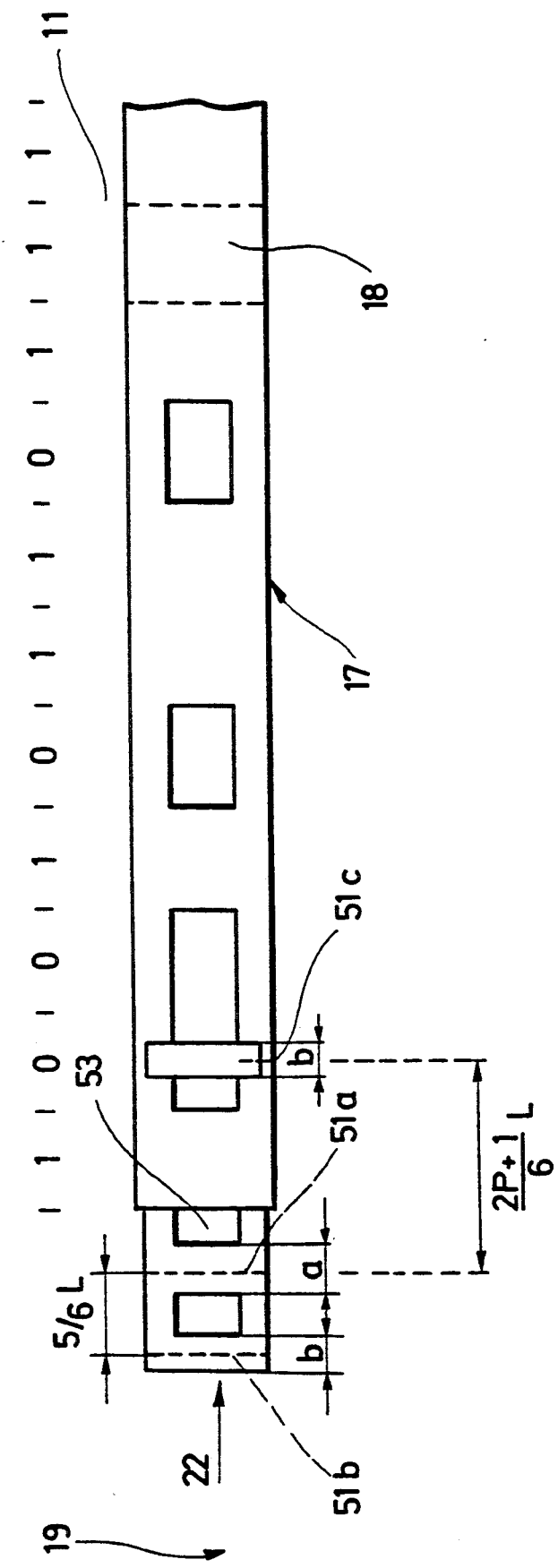

Like FIG. 11, FIG. 12 shows an embodiment in which the block identification 22 is in the form of identification marks 51 in the track of the block 17. In contrast to FIG. 11, the code mark pattern in FIG. 12 begins with a "1" code mark. The identification marks 51b and 51a again have a center spacing from one another of 5/6×L and have the same lengths a and b as in FIG. 11. Here not only the identification mark 51b but also the identification mark 51a is located in the vicinity of the gap 19 before the block 17. The identification mark 51b is approximately centrally above the first "0" code mark in block 17. The center spacing between the identification mark 51a and the identification mark 51c is 2P+1/6 L, where P is an integer greater than 1. The number P is selected such that between the identification mark 51a and the first code mark of block 17, a further identification mark 53 is created, the length of which in the direction of the travel path is greater than the length B of one sensor 41. Like the code marks 21,', the identification mark 53 includes a transparent zone and represents a logical "0". With this disposition of the identification marks 51, as in FIG. 11 before, the result is a reading pattern 43 in which signal sequences 010 or 101 occur only whenever the code reader 12 is reading in the transitional zone between the block 17 and gap 19.

FIG. 13 shows a position indicating apparatus according to the invention in which the code carriers 11 are disposed on the vehicles 4a, 4b. The code reader 12 is stationary. The blocks 17a, 17b, which are located on the code carriers 11a, 11b, are uniquely associated with the vehicles 4a, 4b. From the code word 43 the evaluation unit 14 not only determines the position of the vehicles 4a, 4b, with respect to a reference mark but also recognizes which vehicle is involved.

The advantage of this arrangement is that despite a large number of vehicles 4, the number of code readers 12 is determined solely by the number of zones in which the vehicles 4 must be positioned precisely.

If the readers operate by the same physical principle, then the signals of the auxiliary reader must be distinguishable from those of the code reader. Distinguishability may be either in the signal level or the signal pattern.

If as mentioned above the block identification is formed by a parallel track, then a predetermined signal or signal pattern will be called up in a sensor of the auxiliary reader only when the signals of the code reader represent a reliable code word from one block.

If it is geometrically and mechanically possible to provide a parallel track and to provide a corresponding auxiliary reader at the code reader, then this embodiment is very easy to manufacture from a technical standpoint. The sensor in the auxiliary reader need merely recognize, in the form of a yes/no decision, whether it is located above the parallel track, or not.

The sensor in the auxiliary reader may be an optical sensor, such as a photoelectric barrier. In a simple embodiment, this photoelectric barrier is a forked photoelectric barrier, and the parallel track interrupts the beam of light between the transmitter and receiver of this forked photoelectric barrier whenever the code reader is reading reliable code words. If the block identification is in the track of the block, then similarly to the situation with the parallel track, an embodiment that is technically easy to achieve is obtained if the sensors of the auxiliary reader operate by a different physical principle from the sensors of the code reader. The block identification may extend over the entire block for this purpose. The signals of the auxiliary reader, as with the parallel track, indicate when the code reader is reading reliable code words from a block.

It is possible in this case, for instance, to provide the code carrier with different permeability for gaps and blocks, and to provide a sensor in the auxiliary reader that operates on an inductive basis. The code reader may for example include optical sensors.

The advantage of this embodiment is the simplicity in terms of apparatus. Only a small sensor needs to be provided in the direction of travel next to the code reader, and it can be easily protected against being soiled in any way. Care need merely be taken that the block identification in the direction of the travel path be shorter, by the length of the sensor field of the code reader, than the block itself, and that it also be shifted counter to the block by the width of the sensor of the auxiliary reader.

If the sensors of the two readers operate by the same physical principle, then the gaps either include no code marks, or include code mark sequences that are not allowed for the blocks. Such code mark sequences may comprise identical or periodically located code marks. If the code reader is located above a gap, then an unallowable code word is read at that point, and the evaluation unit recognizes it as such and ignores it.

As mentioned above, the block identification may also include means that effect a shift in signal level. These means may be attenuators, for instance in the form of grids, tailor-made for the sensor. The signals generated in this way in the auxiliary reader, by their level values, indicate a position of the code reader in the transitional zone. The advantage of this version is that no intervention to the code marks need be made. At the same time, the auxiliary reader may be formed by parts of the code reader, which represents a further advantage.

Another option for block identification is to provide an identification mark pattern that has a smaller grid than the code mark pattern. The identification mark pattern for instance generates an alternating sequence of values along the length of one code mark.

To enable recognizing the difference between the two patterns, a plurality of sensors per code mark are provided in the code reader. This has the advantage that the auxiliary reader can as before be formed by sensors of the code reader.

Various changes and modifications may be made, and features described in connection with any one of the embodiments may be used with any of the others, within the scope of the inventive concept.

We claim:

1. Apparatus for determining a position of a vehicle travelling along defined paths, such as crane ways and overhead conveyors, which have at least one running rail along which said vehicle travels, comprising:
   a code carrier located along a travel path direction of said vehicle and extending along said direction, on which code carrier a plurality of code marks are formed;
   code reader means for reading said code marks, said code carrier and said code reader means being movable relative to one another along said travel path direction;
   an evaluation means coupled to the code reader means for evaluating the code marks read by said code reader means;
   wherein said plurality of code marks are grouped into blocks, with each of said blocks comprising more than one code mark that succeed one another in sequence;
   means for assigning an identification to each of said blocks;
   auxiliary code reader means for detecting said assigned block identification; and
   said evaluation means receiving the output of said auxiliary code reader means to determine whether the output of said code reader means corresponds to only code marks of one of said blocks, and to determine the vehicle position based on the detected block identification and the evaluated code marks.

2. The position indicating apparatus of claim 1, wherein the code carrier (11) is stationary, and the code reader (12) is located on the vehicle (4).

3. The position indicating apparatus of claim 1, wherein the code reader (12) is stationary, and the code carrier (11) is disposed on the vehicle (4).

4. The position indicating apparatus of claim 1, wherein at least one code carrier (11) and at least one code reader (12) are stationary, and at least one code carrier (11) and at least one code reader (12) are located on the vehicle (4).

5. The position indicating apparatus of one of claims 3 or 4, wherein, when the code carrier (11) is located on the vehicle (4), the at least one block (17) present on the code carrier (11) is definitive for that vehicle.

6. The position indicating apparatus of claim 1, wherein a plurality of blocks (17a, 17b) are provided one after the other in the direction of the travel path, and that the blocks (17a, 17b) are spatially separated from one another along the travel path by gaps (19).

7. The position indicating apparatus of claim 6, wherein at least in parts of zones, the gaps (19) include a sequence of identical or periodically arranged code marks (18).

8. The position indicating apparatus of claim 6, wherein the gaps (19) include no code marks (18) or code marks combinations that can occur in the blocks.

9. The position indicating apparatus of claim 1, wherein the code marks (18) are binary marks.

10. The position indicating apparatus of claim 1, wherein the code reader (12) has a set of sensors (41), that n sensors (41) are provided for each code mark (18), n being an integer greater than 0, and that the sensors (41) are distributed equidistantly, with a center spacing of 1/n times the code mark length, on the code reader (12) along the code carrier (11).

11. The position indicating apparatus of claim 10, wherein the auxiliary reader (24) is formed by sensors (41) of the code reader (12).

12. The position indicating apparatus of claim 1, wherein the code marks are formed in accordance with a pseudo-random sequence by a given production principle, wherein n sequential code marks form one code word, and each code word occurs only once along the travel path.

13. The position indicating apparatus of claim 12, wherein the last code word of one block (37a), in accordance with the production principle of the pseudo-random sequence, is located before the first code word of the directly ensuing block (37c).

14. The position indicating apparatus of claim 12, wherein said code marks are formed in only one track.

15. The position indicating apparatus of claim 1, wherein the block identification (22) is located in a track parallel to the code carrier.

16. The position indicating apparatus of claim 15, wherein the parallel track has identification marks (27, 28) having at least two values, and that the signals of the code reader (12) represent code marks from a block only whenever the signals of the auxiliary reader (24) represent a predetermined identification mark value or identification mark sequence.

17. The position indicating apparatus of claim 16, wherein the auxiliary reader (24) includes at least one optical sensor.

18. The position indicating apparatus of claim 17, wherein the optical sensor is a photoelectric barrier.

19. The position indicating apparatus of claim 1, wherein the block identification (22) is located in a track that also includes said block.

20. The position indicating apparatus of claim 19, wherein the sensors in the auxiliary reader (24) operate by a different physical principle from that of the sensors (41) in the code reader (12), and that the block identification (22) extends over the entire block.

21. The position indicating apparatus of claim 19, wherein the sensors (41) in the auxiliary reader (24) operate by the same physical principle as the sensors (41) in the code reader (12).

22. The position indicating apparatus of claim 19, wherein the block identification comprises a portion (22a) that precedes the block, and a further portion (22b) that concludes the block.

23. The position indicating apparatus of claim 22, wherein the block identification (22) at least partly covers the code marks on the edge of the associated block (17), or is located outside the block (17).

24. The position indicating apparatus of claim 19 or 23, wherein the block identification (11) includes means (22) that inside or outside the respective block effect a signal level shift in the code reader and/or auxiliary reader (12, 24).

25. The position indicating apparatus of claim 24, wherein the signal level shift means (22) include an attenuator (42) adapted to the type of sensor (41) in the auxiliary reader (24).

26. The position indicating apparatus of claim 25, wherein the attenuator (42) is a grid.

27. The position indicating apparatus of claim 19, wherein the block identification (22) includes a sequence of identification marks (51), and t hat there is a difference between the identification mark pattern and the code mark pattern.

28. The position indicating apparatus of claim 27, wherein the identification marks (51) are located on at least one identification mark carrier, and that the identification mark carrier or carriers are located on the code carrier (11) at least partly covering the code marks (18), or beside the block in the direction of the travel path.

29. The position indicating apparatus of claim 27, wherein the identification marks (51) are binary marks.

30. The position indicating apparatus of claim 27, wherein said difference is constituted in that, measured in the direction of the travel path, the length of the identification marks (51) is different from the length of the code marks (18).

31. The position indicating apparatus of claim 30, wherein the length of at least some of the identification marks (51) is shorter than the length of the code marks (18).

32. The position indicating apparatus of one of claims 27-31, wherein the identification mark pattern alone, or together with the code mark pattern (43), generates an auxiliary signal pattern in the auxiliary reader (24) and-/or in the code reader (12) such that the auxiliary signal pattern is different from a signal pattern that represents only code marks of a block.

33. The position indicating apparatus of claim 32, wherein the auxiliary signal pattern over the length of a code mark (18) has an alternating sequence of values.

34. The position indicating apparatus of claim 29 wherein the identification marks (51) are binary marks, and the auxiliary signal pattern has 1-0-1 or 0-1-0 bit sequence over approximately the length of one code mark.

35. The position indicating apparatus of claim 34, wherein the code marks (18) are binary marks, and a 1 code mark (21'') is located immediately at the edge of the block (17) in the direction of the travel path, and that before the block (17) a 0-1-0-1 sequence of identification marks (51) is provided, such that the first "0" identification mark directly adjoins the block (17), and (51c) is disposed, that a "1" identification mark approximately centrally over the next "0" code mark (21') or sequence of "0" code marks on the block, such that the center spacing from the next "1" identification mark (51a) is $$\frac{2P + 1}{6}$$

times the length of a code mark, where P is an integer greater than 1, and that the length of the identification marks is equivalent to approximately one-third the length of one code mark.

36. The position indicating apparatus of claim 34, wherein the code marks (18) are binary marks, and a "0" code mark (21') is located directly at the edge of the block, and that a "0" identification mark directly adjoins the edge, that directly on both sides of this "0" identification mark there is a "1" identification mark, where the center spacing of these two "1" identification marks is 5/6 times the length of "1" code mark, that located on the block is a further "1" identification mark that is located approximately centrally above a "0" identification mark or a sequence of "0" code marks, where the center spacing of this "1" identification mark from the next "1" identification mark is $$\frac{2P + 1}{6}$$

times the length of one code mark, and P is an integer greater than 1, and that the length of the identification marks is equivalent to approximately one-third the length of one code mark.

* * * * *